United States Patent Office 3,225,020
Patented Dec. 21, 1965

---

3,225,020
THREE-COMPONENT ALUMINUM-TITANIUM TETRAHALIDE CATALYSTS FOR OLEFIN POLYMERIZATION
Harry W. Coover, Jr., Kingsport, Tenn., assignor to Eastman Kodak Company, Rochester, N.Y., a corporation of New Jersey
No Drawing. Filed Nov. 25, 1960, Ser. No. 71,383
The portion of the term of the patent subsequent to Jan. 24, 1978, has been disclaimed and dedicated to the Public
16 Claims. (Cl. 260—93.7)

This application is a continuation-in-part of copending application, Serial No. 724,906, filed Mar. 31, 1958 and now U.S. Patent 2,962,487.

This invention relates to a new and improved polymerization process and is particularly concerned with the use of a novel catalyst combination for preparing high molecular weight solid polyolefins, such as polypropylene, of high density and crystallinity. In a particular aspect the invention is concerned with the preparation of polypropylene and higher polyolefins having a high crystallinity and a high density using a particular catalyst combination which has unexpected catalytic activity.

Polyethylene has heretofore been prepared by high pressure processes to give relatively flexible polymers having a rather high degree of chain branching and a density considerably lower than the theoretical density. Thus, pressures of the order of 500 atmospheres or more and usually of the order of 1000–1500 atmospheres are commonly employed. It has been found that more dense polyethylenes can be produced by certain catalyst combinations to give polymers which have very little chain branching and a high degree of crystallinity. The exact reason why certain catalyst combinations give these highly dense and highly crystalline polymers is not readily understood. Furthermore, the activity of the catalysts ordinarily depends upon certain specific catalyst combinations, and the results are ordinarily highly unpredictable, since relatively minor changes in the catalyst combinations often lead to liquid polymers rather than the desired solid polymers.

The prior art has described the polymerization of α-monoolefins to produce dense, highly crystalline polymers by heating said monoolefins in the presence of a mixture of aluminum and a titanium tetrahalide, and the polymerization of α-monoolefins to form dense crystalline polymers can be effected in the presence of a catalyst formed by heating a mixture of aluminum and a titanium tetrahalide in the absence of a polymerizable hydrocarbon. This later catalyst can be termed a preactivated catalyst and the former catalyst can be termed an unactivated catalyst. Both the inactivated and the preactivated catalysts are particularly useful for polymerizing ethylene to form dense crystalline polymers, but when these catalysts are used for polymerizing propylene and higher α-monoolefins it has been found that the polymeric product contains substantial amounts of relatively low molecular weight polymers which are either greases, oils or rubbery products and very little, if any, crystalline product. Obviously, when a high molecular weight, dense crystalline product is desired, these relatively low molecular weight polymers are undesirable, and it is one of the purposes of this invention to polymerize propylene and higher α-monoolefins in the presence of an improved catalytic mixture wherein the formation of relatively low molecular weight polymers is substantially and unexpectedly reduced.

It is an object of this invention to provide a novel and improved process for polymerizing propylene and higher α-monoolefins and in doing so to overcome disadvantages of earlier procedures. It is a particular object of this invention to provide a novel and improved process for polymerizing propylene in the presence of an improved catalyst composition containing aluminum and a titanium tetrahalide. As a result of the use of this improved catalyst composition unexpectedly improved yields of solid, dense, crystalline polymer are obtained without the concomitant formation of substantial amounts of lower molecular weight polymer. Other objects of this invention will be apparent from the description and claims which follow.

The above and other objects are attained by means of this invention, wherein α-monoolefins, either singly or in admixture, are readily polymerized to high molecular weight solid polymers by effecting the polymerization in the presence of an unactivated or a preactivated aluminum-titanium tetrahalide catalyst composition containing an amide as a third component. The amide can have the structural formula:

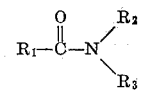

whereby $R_1$ is a radial selected from the group consisting of hydrogen, alkyl radicals containing from 1 to 20 carbon atoms, phenyl, carboxyl, $-OR$, $-N(R)_2$ and

wherein each R is an alkyl radical containing 1 to 4 carbon atoms, $n$ is an integer of 1 to 4, and each of $R_2$ and $R_3$ is a radical selected from the group consisting of hydrogen, alkyl radicals containing 1 to 8 carbon atoms, phenyl and cyclohexyl.

The amide third component of the catalyst can have the structural formulas:

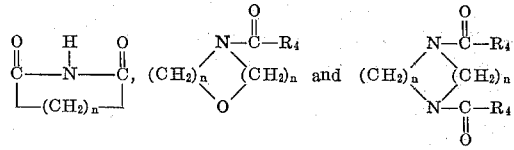

wherein $n$ is an integer of 1 to 4 and $R_4$ is a radial selected from the group consisting of alkyl radicals containing 1 to 4 carbon atoms and phenyl.

Other third components that can be employed in the catalyst are phosphorous-containing amides having the structural formulas:

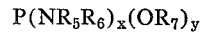

and

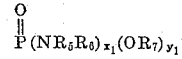

wherein x and y are whole numbers from 1 to 3 and 0 to 2 respectively, the sum of $x$ and $y$ being 3, and $x_1$ and $y_1$ are whole numbers from 1 to 2, the sum of $x_1$ and $y_1$ being 3, and $R_5$, $R_6$ and $R_7$ and alkyl radicals containing 1 to 8 carbon atoms.

Amide third components that can be used in the catalyst system are N,N-dimethylformamide, N,N-dimethylacetamide, N,N-diethylacetamide, N-cyclohexylacetamide, N-t-butylbenzamide, N-methyl-N-phenylacetamide, N-benzylacetamide, n-heptamide, palmitamide, stearanilide, acetanilide, isobutyramide, N,N'-di-t-butylurea, tetramethylurea, succinimide, N,N,N',N'-tetramethyl-adipamide, N-methylisobutyramide, N-benzoylmorpholine, N,N'-diacetylpiperazine, n-butyloxamate, ethyloxanilate, ethyl carbamate, diethyl N-dimethylamidophosphate, ethyl N,N-tetraethyl amidophosphate, diethyl N-dimethyl-amidophosphite, ethyl N,N-tetraethyl diamidophosphite, N,N,N-hexaethyl triamidophosphite, dibutyl N-dipropyl amidophosphate, n-pentyl N,N-tetrabutyl amidophosphate, dipropyl N-dioctyl amidophosphite, n-hexyl N,N-tetrabutyl diamidophosphite, N,N,N-hexa(n-hexyl) triamidophosphite.

Catalyst mixtures that can be employed in practicing our invention are:

(a) aluminum, titanium tetrachloride and N-cyclohexylacetamide.
(b) aluminum, titanium tetrabromide and N-methyl-N-phenyl-acetamide.
(c) aluminum-titanium tetraiodide and palmitamide.
(d) activated aluminum-titanium tetrachloride and acetanilide.
(e) activated aluminum-titanium tetrachloride and isobutyramide.
(f) activated aluminum-titanium tetrabromide and N,N'-di-t-butylurea.
(g) activated aluminum-titanium tetraiodide and ethyl carbamate.
(h) activated aluminum-titanium tetrachloride and ethyl N,N-tetraethyl amidophosphate.
(i) activated aluminum-titanium tetrachloride and dimethyl N-dimethyl amidophosphate.
(j) activated aluminum-titanium tetrachloride and N,N,N-hexamethyl triamidophosphite.
(k) activated aluminum-titanium tetrachloride and dimethyl N-dimethylamidophosphite.

The significantly improved yields of the crystalline polymers produced with the above catalyst were completely unexpected. The inventive process can be carried out in liquid phase in an inert organic liquid and preferably in an inert liquid hydrocarbon vehicle, but in some cases the process is operated without a solvent. The process proceeds with excellent results over a temperature range of from 20° C. to 200° C., although it is preferred to operate within the range of from about 50° C. to about 150° C. Likewise, the reaction pressures may be varied widely from about atmospheric pressure to very high pressures of the order of 20,000 p.s.i. or higher. A particular advantage of the invention is that pressures of the order of 30–1000 p.s.i. give excellent results, and it is not necessary to employ the extremely high pressures which were necessary heretofore. The liquid vehicle employed is desirably one which serves as an inert liquid reaction medium.

The invention is of particular importance in the preparation of highly crystalline polypropylene, the polybutenes and polystyrene although it can be used for polymerizing mixtures of ethylene and propylene as well as other α-monoolefins containing up to 10 carbon atoms. The results obtained by polymerizing the various olefins are quite unexpected. The crystallinity of the polymer as well as the average molecular weight of the product are substantially and unexpectedly improved. The high molecular weight, high density polymers of this invention are insoluble in solvents at ordinary temperatures but they are soluble in such solvents as xylene, toluene or tetralin at elevated temperatures. These solubility characteristics make it possible to carry out the polymerization process under conditions wherein the polymer formed is soluble in the reaction medium during the polymerization and can be precipitated therefrom by lowering the temperature of the resulting mixture. The polypropylene produced by practicing this invention has a softening point above 155° C. and a density of 0.91 and higher. Usually, the density of the polypropylene is of the order of 0.91 to 0.92.

The polypropylene and other polyolefins prepared in accordance with the invention can be molded or extruded and can be used to form plates, sheets, films, or a variety of molded objects which exhibit a higher degree of stiffness than do the corresponding high pressure polyolefins. The products can be extruded in the form of pipe or tubing of excellent rigidity and can be injection molded into a great variety of articles. The polymers can also be cold drawn into ribbons, bands, fibers or filaments of high elasticity and rigidity. Fibers of high strength can be spun from the molten polypropylene obtained according to this process. Other poly-α-olefins as well as copolymers of ethylene and propylene can also be prepared in accordance with this invention.

As has been indicated above, the improved results obtained in accordance with this invention depend upon the particular catalyst combination. Thus, one of the components of the catalyst is aluminum and another component is a titanium tetrahalide wherein the halogen is selected from the group consisting of chlorine, bromine and iodine. The third component of the catalyst composition is an amide as defined above.

The limiting factor in the temperature of the process appears to be the decomposition temperature of the catalyst. Ordinarily, temperatures from 50° C. to 150° C. are employed, although temperatures as low as 20° C. or as high as 250° C. can be employed if desired. Usually, it is not desirable or economical to effect the polymerization at temperatures below 20° C., and the process can be readily controlled at room temperature or higher which is an advantage from the standpoint of commercial processing. The pressure employed is usually only sufficient to maintain the reaction mixture in liquid form during the polymerization, although higher pressures can be used if desired. The pressure is ordinarily achieved by pressuring the system with the monomer whereby additional monomer dissolves in the reaction vehicle as the polymerization progresses. The catalyst compositions of this invention, when reacted with water do not produce hydrogen.

The polymerization embodying the invention can be carried out batchwise or in a continuous flowing stream process. The continuous processes are preferred for economic reasons, and particularly good results are obtained using continuous processes wherein a polymerization mixture of constant composition is continuously and progressively introduced into the polymerization zone and the mixture resulting from the polymerization is continuously and progressively withdrawn from the polymerization zone at an equivalent rate, whereby the relative concentration of the various components in the polymerization zone remains substantially unchanged during the process. This results in formation of polymer of extremely uniform molecular weight distribution over a relatively narrow range. Such uniform polymers possess distinct advantages since they do not contain any substantial amount of the low molecular weight or high molecular weight formations which are ordinarily found in polymers prepared by batch reactions.

In the continuous flowing stream process, the temperature is desirably maintained at a substantially constant value within the preferred range in order to achieve the highest degree of uniformity. Since it is desirable to employ a solution of the monomer of relatively high concentration, the process is desirably effected under a pressure of from 30 to 1000 p.s.i. obtained by pressuring the system with the monomer being polymerized. The amount of vehicle employed can be varied over rather wide limits with relation to the monomer and catalyst mixture. Best results are obtained using a concentration of catalyst of from about 0.1% to about 2% by weight based on the weight of the vehicle. The concentration of the monomer in the vehicle will vary rather widely depending upon the reaction conditions and will usually range from about 2 to 50% by weight. For a solution type of process it is preferred to use a concentration from about 2 to about 10% by weight based on the weight of the vehicle, and for a slurry type of process higher concentrations, for example up to 40% and higher are preferred. Higher concentrations of monomer ordinarily increase the rate of polymerization, but concentrations above 5 to 10% by weight in a solution process are ordinarily less desirable because the polymer dissolved in the reaction medium results in a very viscous solution.

The titanium tetrahalide in the catalyst is usually employed in an amount of from 0.1 to 45 parts by weight per part of aluminum metal, and the molar ratio of titanium tetrahalide to the third component of the catalytic mixture can be varied within the range of 1:1 to 1:1.0. A particularly effective catalyst contains one mole of titanium tetrahalide and 0.25 mole of the third component per mole of aluminum. The polymerization time can be varied as desired and will usually be of the order of from 30 minutes to several hours in batch processes. Contact times of from 1 to 4 hours are commonly employed in autoclave type reactions. When a continuous process is employed, the contact time in the polymerization zone can also be regulated as desired, and in some cases it is not necessary to employ reaction or contact times much beyond one-half to one hour since a cyclic system can be employed by precipitation of the polymer and return of the vehicle and unused catalyst to the charging zone wherein the catalyst can be replenished and additional monomer introduced.

The organic vehicle employed can be aliphatic alkane or cycloalkane such as pentane, hexane, heptane or cyclohexane, or a hydrogenated aromatic compound such as tetrahydronaphthalene or decahydronaphthalene, or a high molecular weight liquid paraffin or mixture of paraffins which are liquid at the reaction temperature, or an aromatic hydrocarbon such as benzene, toluene, xylene, or the like, or a halogenated aromatic compound such as chlorobenzene, chloronaphthalene, or orthodichlorobenzene. The nature of the vehicle is subject to considerable variation, although the vehicle employed should be liquid under the conditions of reaction and relatively inert. The hydrocarbon liquids are desirably employed. Other solvents which can be used include ethyl benzene, isopropyl benzene, ethyl toluene, n-propyl benzene, diethyl benzenes, mono and dialkyl naphthalenes, n-pentane, n-octane, isooctane, methyl cyclohexane, tetralin, decalin, and any of the other well-known inert liquid hydrocarbons.

The polymerization ordinarily is accomplished by merely admixing the components of the polymerization mixture which is then adjusted to the reaction temperature. The more elevated temperatures can be used to increase the solubility of polymeric product in the vehicle. When the highly uniform polymers are desired employing the continuous process wherein the relative proportions of the various components are maintained substantially constant, the temperature is desirably controlled within a relatively narrow range. This is readily accomplished since the solvent vehicle forms a high percentage of the polymerization mixture and hence can be heated or cooled to maintain the temperature as desired.

The aluminum and titanium tetrahalide that are employed in the catalytic mixture of this invention can be in either the unactivated or the preactivated form. When the unactivated form is employed the aluminum and titanium tetrahalide as well as the third component of the catalyst are added to the polymerization reaction mixture, and in most instances it is usually necessary to undergo an induction period before the monomer in the reaction mixture is actually polymerized to the desired porduct. Preferably, the aluminum and titanium tetrahalide are employed in a preactivated form. For preactivation of the catalyst, a mixture of aluminum and titanium tetrahalide is heated for varying periods of time in the absence of polymerizable monomer, such as ethylene, propylene and higher monoolefins. Temperatures of 50° C. up to about 300° C. are usually sufficient for the preactivation, and contact times varying from 5 minutes to 48 hours can be used. The catalytic mixture that is formed as a result of the preactivation of aluminum and titanium tetrahalide has been found to contain aluminum trihalide and titanium trihalide in addition to aluminum and titanium tetrahalide. This mixture along with the third component of the catalyst described is outstandingly effective for polymerizing propylene and higher monoolefins while at the same time reducing substantially the amount of low molecular weight polymer formed during the reaction. The aluminum that is employed in the catalyst mixture is preferably in flake or finely-divided form for optimum activity, rapid polymerization and high yield of polymer but actually any form of aluminum metal can be used in the process. When a granular aluminum of commerce is used it is desirable to clean the surface of the granules with an acid or acid mixtures such as a mixture of nitric and hydrofluoric acids or with a base for optimum results. However, the cleaning of the aluminum is not absolutely essential to the invention. Titanium tetrachloride is the preferred titanium tetrahalide although titanium tetrabromide as well as titanium tetraiodide can be employed in the catalytic mixture.

From the detailed disclosure of this invention it is quite apparent that in this polymerization procedure a novel catalyst, not suggested in prior art polymerization procedures, is employed. As a result of the use of this novel catalyst it is possible to produce polymeric hydrocarbons, particularly polypropylene, having properties not heretofore obtainable. For example, polypropylene prepared in the presence of catalyst combinations within the scope of this invention is substantially free of rubbery and oily polymers and thus it is not necessary to subject such polypropylene of this invention to extraction procedures in order to obtain a commercial product. Also, polypropylene produced in accordance with this invention possesses unexpectedly high crystallinity, an unusually high softening point and outstanding thermal stability. Such polypropylene also has a very high stiffness as a result of the unexpectedly high crystallinity. The properties imparted to polypropylene prepared in accordance with this invention thus characterize and distinguish this polypropylene from polymers prepared by prior art polymerization procedures.

The novel catalysts defined above can be used to produce high molecular weight crystalline polymeric hydrocarbons. The molecular weight of the polymers can be varied over a wide range by introducing hydrogen to the polymerization reaction. Such hydrogen can be introduced separately or in admixture with the olefin monomer. The polymers produced in accordance with this invention can be separated from polymerization catalyst by suitable extraction procedures, for example, by washing with water or lower aliphatic alcohols such as methanol.

The catalyst compositions have been described above as being effective primarily for the polymerization of α-monoolefins. These catalyst compositions can, however, be used for polymerizing other α-olefins, and it is not necessary to limit the process of the invention to monoolefins. Other α-olefins that can be used are butadiene, isoprene, 1,3-pentadiene and the like.

The diluents employed in practicing this invention can be advantageously purified prior to use in the polymerization reaction by contacting the diluent, for example, in a distillation procedure or otherwise, with the polymerization catalyst to remove undesirable trace impurities. Also, prior to such purification of the diluent the catalyst can be contacted advantageously with polymerizable α-monoolefin.

Thus, by means of this invention polyolefins such as polypropylene are readily produced using a catalyst combination whose improved effectiveness could not have been predicted. The polymers thus obtained can be extruded, mechanically milled, cast or molded as desired. The polymers can be used as blending agents with relatively more flexible polyhydrocarbons to give any desired combination of properties. The polymers can also be blended with antioxidants, stabilizers, plasticizers, fillers, pigments, and the like, or mixed with other polymeric materials, waxes and the like.

The following examples are illustrative of this invention.

Example I

Inside a nitrogen-filled dry box the following materials were placed into a dry, 500-ml. pressure bottle: 100 ml. of dry heptane and 3 g. of a catalyst mixture which comprised a 1:1:0.25 molar ratio of preactivated aluminum-titanium tetrachloride and N,N-dimethylformamide. The pressure bottle was removed from the dry box, attached to a Parr hydrogenation apparatus in which propylene was being used in place of hydrogen, and shaking was initiated. The bottle and its contents were heated to 75° C. under 30 p.s.i. propylene pressure and maintained under these conditions for a total of 6 hours. The reaction vessel was detached then from the shaking apparatus, dry isobutyl alcohol was added to deactivate the catalyst, and then the polymer was washed with hot, dry isobutanol to remove the catalyst residues. A total of 9.3 g. of highly crystalline polypropylene was obtained having an inherent viscosity in tetralin at 145° C. of 1.86 and a density of 0.910.

When a control experiment was run using only the aluminum and titanium tetrachloride, omitting the N,N-dimethylformamide, no solid polypropylene was formed under the above conditions.

A good yield of crystalline polypropylene was obtained when N,N-dimethylacetamide was used in place of the N,N-dimethylformamide in the above experiment.

Example II

Inside a nitrogen-filled dry box the following materials were placed into a 285 ml. stainless steel autoclave: 100 ml. of dry mineral spirits (B.P. 197° C.), a total of 2 g. of a 1:1:0.25 molar ratio of preactivated aluminum-titanium tetrachloride, and N,N,N',N'-tetramethyladipamide. The autoclave was then placed in a rocker attached to a source of liquid propylene and 100 ml. of anhydrous liquid propylene monomer was added. Rocking was initiated and the mixture was heated to 85° C. and maintained at this temperature during a polymerization period of 6 hrs. The polymer was worked up as described in Example I to give a yield of 14.8 g. of highly crystalline polypropylene having an inherent viscosity of 2.05 in tetralin at 145° C. When hydrogen was admitted to the polymerization vessel and was maintained there at 50 p.s.i. partial pressure, the inherent viscosity of the product was 1.70. An increase in the hydrogen pressure to 500 p.s.i. in a similar experiment produced a very low-molecular-weight crystalline polypropylene of inherent viscosity 0.29.

Example III

The procedure of Example II was used to polymerize propylene with no solvent present. One hundred grams of propylene monomer was used and within the 6-hr. polymerization period at 85° C., a 19.0 g. yield of highly crystalline polypropylene of inherent viscosity 2.65 was obtained.

Example IV

The procedure of Example II was employed to polymerize a 50 g. charge of 3-methyl-1-butene using 3 g. of catalyst made up of aluminum, titanium tetrachloride and ethyl N,N'-tetraethylamidophosphate in a molar ratio of 1:1:0.1. The yield was 18 g. of highly crystalline poly(3-methyl-1-butene) having an inherent viscosity of 1.30 and a crystalline melting point (oriented fiber) of 310° C.

N-acetylmorpholine could be substituted for the ethyl N,N'-tetraethylamidophosphate to give similar results.

Example V

The procedure of Example II was used to polymerize propylene using 1 g. of catalyst comprised of aluminum metal, titanium tetrabromide and tetramethylurea in a 1:2:2 molar ratio. A 32 g. yield of crystalline polypropylene was obtained. This polymer had an inherent viscosity of 2.10 and a density of 0.914.

Example VI

The procedure of Example II was employed to polymerize allylbenzene using 2 g. of a catalyst comprised of aluminum, titanium tetrachloride and succinimide in a 1:2:1 molar ratio. This yield of crystalline poly(allylbenzene) was 27 percent.

Example VII

The procedure of Example II was employed to polymerize vinylcyclohexane using 2 g. of catalyst composed of a 2:2:1 molar ratio of aluminum metal, titanium tetrachloride and n-heptamide. A 15 perecnt yield of highly crystalline poly(vinylcyclohexane) having an inherent viscosity of 1.35 was obtained.

Example VIII

The procedure of Example II was employed to polymerize propylene using a 1:2:0.5 molar ratio of activated aluminum, titanium tetrachloride and N-cyclohexylacetamide. From 51 g. of propylene monomer, a 31 g. yield of polypropylene of inherent viscosity 1.60 was obtained.

Example IX

In a nitrogen-filled dry box, a 7 oz. tapered pressure bottle was charged in order with 40 ml. of dry benzene, 20 g. of 4-methyl-1-pentene and 1 g. of a catalyst consisting of aluminum metal, titanium tetrachloride and ethyl carbamide in a molar ratio of 1:1:2. The bottle was capped, placed on a rotating wheel in a constant-temperature water bath maintained at 70° C. and was allowed to remain under these conditions for 24 hours. At the end of this period the bottle was removed, allowed to cool and opened. The polymer was dissolved in hot xylene and reprecipitated by the addition of dry isobutanol to the xylene solution in a Waring Blendor. The polymer was washed several times with hot isobutanol and was dried. The crystalline poly(4-methyl-1-pentene) weighed 9.5 g. and melted at 200–205° C. (powder).

Good yields of crystalline poly(4-methyl-1-pentene) were also obtained when N-methyl-N-phenylacetamide or dimethyl N,N-dimethylamidophosphate was substituted for the ethyl carbamate above.

Comparable results were also obtained when titanium tetraiodide was used in place of the titanium tetrachloride above.

I claim:

1. In the polymerization of propylene to form solid crystalline polymer, the improvement which comprises effecting the polymerization in the presence of a catalytic mixture consisting essentially of activated aluminum-titanium tetrachloride and a third component selected from the amides having the formula $P(NR_5R_6)_x(OR_7)_y$ wherein $R_5$, $R_6$ and $R_7$ are alkyl radicals containing 1 to 8 carbon atoms, and $x$ and $y$ are whole numbers from 1 to 3 and 0 to 2, respectively, the sum of $x$ and $y$ being 3, the molar ratio of titanium tetrachloride to third component being within the range of 1:1 to 1:0.1.

2. In the polymerization of propylene to form solid crystalline polymer the improvement which comprises effecting the polymerization in the presence of a catalytic mixture consisting essentially of activated aluminum-titanium tetrachloride, and a third component selected from the amides having the formula:

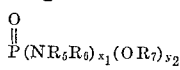

wherein $R_5$, $R_6$ and $R_7$ are alkyl radicals containing 1 to 8 carbon atoms, and $x_1$ and $y_1$ are whole numbers from 1 to 2, the sum of $x_1$ and $y_1$ being 3, the molar ratio of titanium tetrachloride to third component being within the range of 1:1 to 1:0.1, 3. In the polymerization of propylene to form solid crystalline polymer the improvement which comprises effecting the polymerization in the presence of a catalytic mixture consisting essentially of activated aluminum-titanium tetrachloride and N,N-dimethylformamide, the molar ratio of titanium tetrachloride to N,N-dimethylformamide being within the range of 1:1 to 1:0.1.

4. In the polymerization of propylene to form solid crystalline polymer the improvement which comprises effecting the polymerization in the presence of a catalytic mixture consisting essentially of activated aluminum-titanium tetrachloride and N,N,N',N'-tetramethyladipamide, the molar ratio of titanium tetrachloride to N,N,N',N'-tetramethyladipamide being within the range of 1:1 to 1:0.1.

5. In the polymerization of propylene to form solid crystalline polymer the improvement which comprises effecting the polymerization in the presence of a catalytic mixture consisting essentially of activated aluminum-titanium tetrachloride and ethyl N,N-tetraethyl amidophosphate, the molar ratio of titanium tetrachloride to ethyl N,N-tetraethyl amidophosphate being within the range of 1:1 to 1:0.1.

6. In the polymerization of propylene to form solid crystalline polymer the improvement which comprises effecting the polymerization in the presence of a catalytic mixture consisting essentially of activated aluminum-titanium tetrachloride and N,N-dimethylacetamide, the molar ratio of titanium tetrachloride to N,N-dimethylacetamide being within the range of 1:1 to 1:0.1.

7. As a composition of matter, a catalytic mixture consisting essentially of activated aluminum-titanium tetrachloride, and a third component selected from the amides having the formula $P(NR_5R_6)_x(OR_7)_y$ wherein $R_5$, $R_6$ and $R_7$ are alkyl radicals containing 1 to 8 carbon atoms, and $x$ and $y$ are whole numbers from 1 to 3 and 0 to 2, respectively, the sum of $x$ and $y$ being 3, the molar ratio of titanium tetrachloride to third component being within the range of 1:1 to 1:0.1.

8. As a composition of matter, a catalytic mixture consisting essentially of activated aluminum-titanium tetrachloride, and a third component selected from the amides having the formula:

$$P(NR_5R_6)_{x_1}(OR_7)_{y_1}$$

wherein $R_5$, $R_6$ and $R_7$ are alkyl radicals containing 1 to 8 carbon atoms, and $x_1$ and $y_1$ are whole numbers from 1 to 2, the sum of $x_1$ and $y_1$ being 3, the molar ratio of titanium tetrachloride to third component being within the range of 1:1 to 1:0.1.

9. As a composition of matter, a catalytic mixture consisting essentially of activated aluminum-titanium tetrachloride and N,N-dimethylformamide, the molar ratio of titanium tetrachloride to N,N-dimethylformamide being within the range of 1:1 to 1:0.1.

10. As a composition of matter, a catalytic mixture consisting essentially of activated aluminum-titanium tetrachloride and N,N,N',N'-tetramethyladipamide, the molar ratio of titanium tetrachloride to N,N,N',N'-tetramethyladipamide being within the range of 1:1 to 1:0.1.

11. As a composition of matter, a catalytic mixture consisting essentially of activated aluminum-titanium tetrachloride and ethyl N,N-tetraethyl amidophosphate, the molar ratio of titanium tetrachloride to ethyl N,N-tetraethyl amidophosphate being within the range of 1:1 to 1:0.1.

12. As a composition of matter, a catalytic mixture consisting essentially of activated aluminum-titanium tetrachloride and N,N-dimethylacetamide, the molar ratio of titanium tetrachloride to N,N-dimethylacetamide being within the range of 1:1 to 1:0.1.

13. In the polymerization of α-monoolefinic hydrocarbon containing 3 to 10 carbon atoms to form solid crystalline polymer, the improvement which comprises catalyzing the polymerization with a catalytic mixture consisting essentially of aluminum, titanium tetrahalide, and a third component selected from the amides having the formulas:

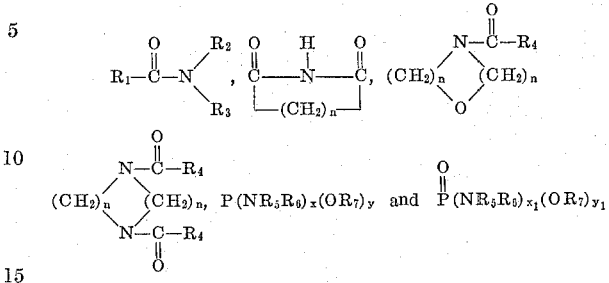

wherein $R_1$ is a radical selected from the group consisting of alkyl radicals containing 1 to 20 carbon atoms, phenyl, carboxyl, —OR, —N(R)$_2$ and $$-(CH_2)_{n_1}\overset{O}{\overset{\|}{C}}NR_2$$

wherein each R is an alkyl radical containing 1 to 4 carbon atoms, $n_1$ is an integer of 1 to 4, and wherein each of $R_2$ and $R_3$ is a radical selected from the group consisting of hydrogen, alkyl radicals containing 1 to 8 carbon atoms, phenyl and cyclohexyl, $R_4$ is a radical selected from the group consisting of alkyl radicals containing 1 to 4 carbon atoms and phenyl and $n$ is an integer of 1 to 4, and wherein $R_5$, $R_6$ and $R_7$ are alkyl radicals containing 1 to 8 carbon atoms, $x$ and $y$ are whole numbers from 1 to 3 and 0 to 2, respectively, the sum of $x$ and $y$ being 3 and $x_1$ and $y_1$ are whole numbers from 1 to 2, the sum of $x_1$ and $y_1$ being 3, the molar ratio of titanium tetrahalide to third component being within the range of 1:1 to 1:0.1.

14. In the polymerization of propylene to form solid crystalline polymer the improvement which comprises effecting the polymerization in the presence of a catalytic mixture consisting essentially of activated aluminum-titanium tetrahalide, and a third component selected from the amides having the formula:

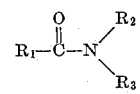

wherein $R_1$ is a radical selected from the group consisting of alkyl radicals containing 1 to 20 carbon atoms, phenyl, carboxyl, —OR, —N(R)$_2$ and $$-(CH_2)_{n_1}\overset{O}{\overset{\|}{C}}NR_2$$

wherein each R is an alkyl radical containing 1 to 4 carbon atoms and wherein $n_1$ is an integer of 1 to 4, and wherein each of $R_2$ and $R_3$ is a radical selected from the group consisting of hydrogen, alkyl radicals containing 1 to 8 carbon atoms, phenyl and cyclohexyl, the molar ratio of titanium tetrahalide to third component being within the range of 1:1 to 1:0.1.

15. As a composition of matter, a catalytic mixture consisting essentially of aluminum, titanium tetrahalide, and a third component selected from the amides having the formulas:

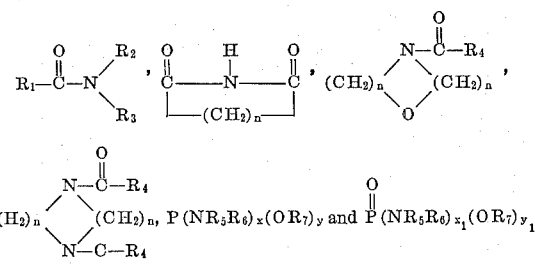

wherein $R_1$ is a radical selected from the group consisting of alkyl radicals containing 1 to 20 carbon atoms, phenyl, carboxyl, —OR, —$N(R)_2$ and

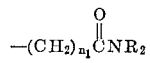

wherein each R is an alkyl radical containing 1 to 4 carbon atoms, $n_1$ is an integer of 1 to 4, and wherein each of $R_2$ and $R_3$ is a radical selected from the group consisting of hydrogen, alkyl radicals containing 1 to 8 carbon atoms, phenyl and cyclohexyl, $R_4$ is a radical selected from the group consisting of alkyl radicals containing 1 to 4 carbon atoms and phenyl and $n$ is an integer of 1 to 4, and wherein $R_5$, $R_6$, and $R_7$ are alkyl radicals containing 1 to 8 carbon atoms, $x$ and $y$ are whole numbers from 1 to 3 and 0 to 2, respectively, the sum of $x$ and $y$ being 3 and $x_1$ and $y_1$ are whole numbers from 1 to 2, the sum of $x_1$ and $y_1$ being 3, the molar ratio of titanium tetrahalide to third component being within the range of 1:1 to 1:0.1.

16. As a composition of matter, a catalytic mixture consisting essentially of activated aluminum-titanium tetrahalide, and a third component selected from the amides having the formula:

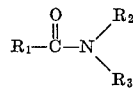

wherein $R_1$ is a radical selected from the group consisting of alkyl radicals containing 1 to 20 carbon atoms, phenyl, carboxyl, —OR, —$N(R)_2$ and

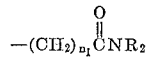

wherein each R is an alkyl radical containing 1 to 4 carbon atoms and wherein $n_1$ is an integer of 1 to 4, and wherein each of $R_2$ and $R_3$ is a radical selected from the group consisting of hydrogen, alkyl radicals containing 1 to 8 carbon atoms, phenyl and cyclohexyl, the molar ratio of titanium tetrahalide to third component being within the range of 1:1 to 1:0.1.

References Cited by the Examiner
UNITED STATES PATENTS

| | | | |
|---|---|---|---|
| 2,886,561 | 5/1959 | Reynolds | 260—94.9 |
| 2,965,627 | 12/1960 | Field et al. | 260—94.9 |
| 2,969,345 | 1/1961 | Coover et al. | 260—93.7 |
| 2,969,346 | 1/1961 | Coover et al. | 260—93.7 |
| 3,010,787 | 11/1961 | Tornquist | 260—93.7 |

FOREIGN PATENTS 538,782   12/1955   Belgium.

OTHER REFERENCES

Wertheim: "Textbook of Organic Chemistry," 2nd ed., 1945. Published by the Blakiston Co. (page 227 relied on).

JOSEPH L. SCHOFER, *Primary Examiner.*

MORRIS LIEBMAN, *Examiner.*